July 28, 1931. J. L. WOODBRIDGE 1,816,035
STORAGE BATTERY
Filed April 28, 1928
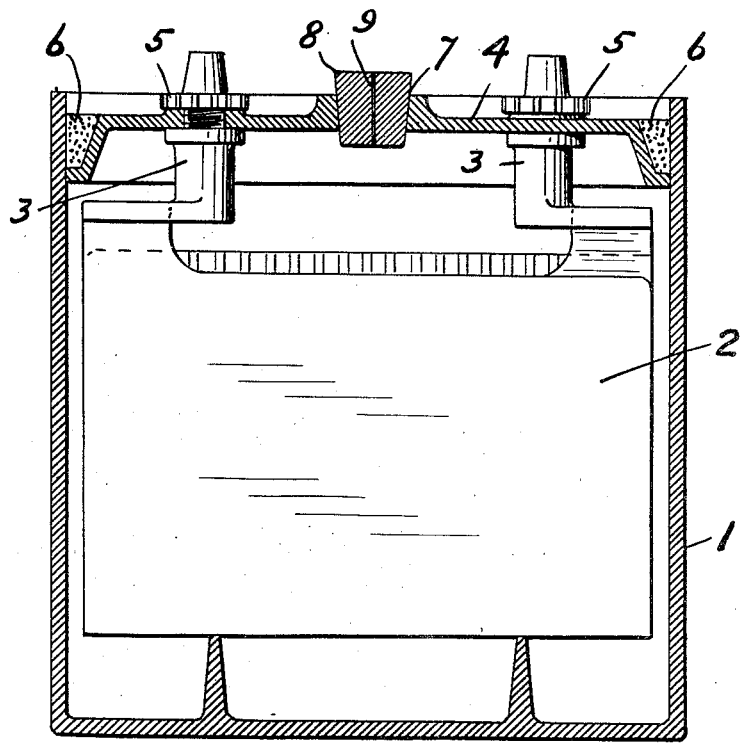
WITNESS:
INVENTOR
Joseph Lester Woodbridge
BY
Augustus B. Stoughton
ATTORNEY.

Patented July 28, 1931

1,816,035

UNITED STATES PATENT OFFICE

JOSEPH LESTER WOODBRIDGE, OF PHILADELPHIA, PENNSYLVANIA

STORAGE BATTERY

Application filed April 28, 1928. Serial No. 273,449.

It is often found convenient to ship and store storage battery cells in a fully charged condition but with the electrolyte removed from the cells. This is commonly known as a charged and dumped condition. The removal of the electrolyte is of advantage to prevent spillage in transit since a storage battery cell cannot be hermetically sealed without danger of developing excessive internal pressures due to gases which are generated internally. Even when the electrolyte is removed from the cell, there is a residue retained in the pores of the plates and wood separators, and it is important to retain this residue of electrolyte in order to prevent the separators from drying and splitting. If air is freely admitted to a storage cell in this condition, the oxygen of the air in the presence of moisture will combine with the active material of the negative plates, causing the plates to lose their charge. If therefore it is desired to keep the plates in a charged condition, the atmosphere must be practically excluded. On the other hand, if a cell in this condition is hermetically sealed, the residue of electrolyte in the plates will gradually react on the active material, causing evolution of hydrogen gas, and while this reaction has but little effect on the capacity of the plates owing to the limited amount of electrolyte available, the evolution of hydrogen will develop internal pressure, which may break through the seal or do other damage if not relieved.

The principal object of the present invention is to obviate the defects and disadvantages above referred to and to provide a method and means by which storage battery cells in fully charged condition may be stored after the removal of the electrolyte for many months without material loss of capacity and without developing excessive pressure.

To these and other ends hereinafter set forth the invention, generally stated, may be said to comprise the method of minimizing the oxidation of the negative pole plates and relieving the hydrogen pressure developed in the cell of a charged dumped lead acid secondary battery, which consists in restraining the molecular diffusion of air into the cell and balancing the restricted molecular diffusion against the dynamic flow of gas from the cell.

The invention also comprises venting means for a storage battery cell in charged and dumped condition having a vent duct of small cross-sectional area compared with its length.

Storage battery cells in a fully charged condition may be stored after the removal of the electrolyte for many months without serious loss of capacity and without developing excessive pressure by providing a venting device in which there is a suitably proportioned duct from the interior to the exterior of the cell, the cell being otherwise hermetically sealed. This duct should be of considerable length in comparison with its diameter and it acts to relieve the pressure developed within the cell by allowing the hydrogen gas to escape as it is formed. A minute duct of this kind also acts to oppose diffusion of gases therethrough and by designing the duct with a sufficiently small diameter and of sufficient length, the access of the external air to the interior of the cell can be made so restricted that the discharge of the plates due to oxidation will be negligible. This retardation is further increased by the outward flow of hydrogen through the capillary duct, which further tends to prevent the air from entering.

The single figure of the accompanying drawing is an elevation, partially in section, of a storage battery cell embodying one form of my invention.

In the drawing, 1 is the container of the cell, 2 the plates and 3 the terminal posts, the latter being sealed into the openings in the cover 4 by means of seal nuts 5. The cover is sealed to the container by means of sealing compound 6, thus producing a hermetically sealed cell, the only vent being that provided by the vent opening 7, in which is inserted a tightly fitting stopper 8, having a capillary duct 9 extending axially through it. The design of this duct 9 constitutes the important feature of this invention. I find that satisfactory results are obtained if the diameter is not over 5 per cent. of the length. It will be noted that the greater the length of this duct and the smaller its diameter, the slower will be the diffusion of the external air into the interior of the cell and consequently the slower will be the oxidation of the negative plates when the battery is standing in a charged condition with the electrolyte removed, the only limit to the restriction which may be introduced into the design of this duct being the provision for relieving the internal pressure due to the formation of hydrogen gas in the cell.

The evolution of gases from the plates is appreciable for some hours after the charge has been interrupted and if it is desired to reduce the capillary duct in the vent to a minimum, the vent opening may be left open by leaving out the plug 8 for a few hours after the end of charge until the gas trapped in the pores of the plates has had an opportunity to escape. The plug 8 may then be inserted, the rate of gas evolution being reduced to an exceedingly small value, which can be relieved by the capillary duct 9. In some cases the duct 9, in order to be effective in preventing the discharge of the plates while standing, must be considerably smaller than that required to provide for the escape of the gas developed during ordinary charging conditions without causing excessive internal pressure. In such case the plug 8 must be removed during the normal charging periods as well as for adding water to the cell.

The mode of operation may be described as follows: within the cell there is an accumulation of hydrogen and outside of the cell there is atmospheric air. Each of these gases tends to diffuse from the space occupied by it into the adjoining space, the rate of diffusion being controlled by the cross section and length of the communicating passage which establish a diffusion gradient along the length of the passage so that without any dynamic flow of gas through the passage the oxygen and nitrogen from the air will gradually pass into the cell by molecular diffusion and a corresponding volume of hydrogen will diffuse out of the cell into the atmosphere. There is, however, a dynamic flow of gas from the interior of the cell because of the continuing evolution of hydrogen from the plates, and this is balanced against or opposed to the molecular diffusion, so that little or no oxygen gets into the cell. From this description it is evident that although I have referred to certain dimensions which establish a proper molecular gradient for certain batteries, still the invention is not limited thereby.

I claim:

1. The combination of a battery in a charged and dumped condition containing a residue of electrolyte and a permanently open vent of such minute cross-section compared to its length that the gases produced by local action between the residual electrolyte and the active material of the plates are caused to escape at a velocity which substantially offsets the diffusion of air into the cell, the proportion of length to cross-section of the ducts being adapted to retard the admission of air into the battery and at the same time to permit gas generated to escape.

2. The combination of a charged, dumped and unwashed storage battery cell adapted to generate gas in less quantity than in normal operation and a pneumatic vent comprising a permanently open hole sufficiently restricted to pass out of the cell the lesser quantity of gas at a sufficient speed to oppose the entrance of air by diffusion.

3. The combination of a battery in a charged and dumped condition containing a residue of electrolyte and a vent comprising a permanently open hole whose diameter is not over five per cent. of its length so that the gases produced by local action between the residual electrolyte and the active material of the plates are caused to escape at a velocity which substantially offsets the diffusion of air into the cell.

JOSEPH LESTER WOODBRIDGE.